(12) United States Patent
Arnold et al.

(10) Patent No.: US 11,545,818 B2
(45) Date of Patent: Jan. 3, 2023

(54) CABLE MANAGEMENT DEVICE

(71) Applicant: Keymed (Medical & Industrial Equipment) Ltd., Southend-on-Sea (GB)

(72) Inventors: Adam Arnold, Southend-on-Sea (GB); John Hynes, Southend-on-Sea (GB)

(73) Assignee: Keymed (Medical & Industrial Equipment) Ltd. of Keymed House, Southend-on-Sea (GB)

( * ) Notice: Subject to any disclaimer, the term of this patent is extended or adjusted under 35 U.S.C. 154(b) by 0 days.

(21) Appl. No.: 17/153,501

(22) Filed: Jan. 20, 2021

(65) Prior Publication Data

US 2021/0226429 A1 Jul. 22, 2021

(30) Foreign Application Priority Data

Jan. 22, 2020 (GB) ...................................... 2000943

(51) Int. Cl.
*H02G 3/04* (2006.01)
*F16L 3/12* (2006.01)

(52) U.S. Cl.
CPC .............. *H02G 3/0456* (2013.01); *F16L 3/12* (2013.01)

(58) Field of Classification Search
CPC ............ H02G 3/0456; F16L 3/12; F16L 3/22; F16L 3/221; F16L 3/222; F16L 3/223; F16L 3/23; F16L 3/123; F16L 3/24; F16L 3/243; F16L 3/2431; H04K 7/1491
USPC ............................... 248/74.1, 222.51, 222.52
See application file for complete search history.

(56) References Cited

U.S. PATENT DOCUMENTS

| | | | |
|---|---|---|---|
| 5,062,605 A * | 11/1991 | Muhlethaler | H02G 3/0443 248/68.1 |
| 5,893,539 A | 4/1999 | Tran et al. | |
| 5,921,402 A * | 7/1999 | Magenheimer | H04Q 1/023 211/94.01 |
| 6,175,079 B1 | 1/2001 | Johnston et al. | |
| 6,215,069 B1 * | 4/2001 | Martin | H02G 3/0456 174/95 |
| 6,427,952 B2 | 8/2002 | Caveney et al. | |
| 8,596,588 B1 * | 12/2013 | Sikkema | H02G 3/30 248/220.21 |
| 8,882,051 B2 * | 11/2014 | Bleus | H02G 3/30 248/68.1 |
| 8,985,530 B2 * | 3/2015 | Jette | H02G 3/0443 248/65 |

(Continued)

FOREIGN PATENT DOCUMENTS

DE 202004010496 U1 11/2005
DE 102017006291 A1 1/2019

OTHER PUBLICATIONS

European Patent Office, Search Report in European Patent Application No. 20211171.2, 11 pp. (dated May 18, 2021).

(Continued)

*Primary Examiner* — Christopher Garft
(74) *Attorney, Agent, or Firm* — Leydig, Voit & Mayer, Ltd.

(57) ABSTRACT

A cable management device comprises first and second arms and a base together defining an enclosure for one or more cables. The device includes an attachment and spacer device and a stabilizing clip to releasably attach the device to a support element and to space the enclosures of adjacent devices from one another.

8 Claims, 4 Drawing Sheets

(56) References Cited

U.S. PATENT DOCUMENTS

| | | | |
|---|---|---|---|
| 9,188,248 B2 | 11/2015 | Kern et al. | |
| 9,212,765 B1* | 12/2015 | Chia | F16L 3/127 |
| 2001/0030267 A1* | 10/2001 | Caveney | H04Q 1/06 |
| | | | 248/62 |
| 2009/0078835 A1* | 3/2009 | Newhouse | F16L 3/1218 |
| | | | 248/315 |
| 2012/0228001 A1* | 9/2012 | Li | H05K 7/1491 |
| | | | 174/135 |
| 2013/0168509 A1* | 7/2013 | Chen | H05K 7/1421 |
| | | | 248/74.1 |
| 2014/0259566 A1* | 9/2014 | Rouleau | F16L 3/243 |
| | | | 24/457 |
| 2015/0086373 A1 | 3/2015 | Kaneko et al. | |
| 2015/0159778 A1 | 6/2015 | Kuhm | |

OTHER PUBLICATIONS

United Kingdom Intellectual Property Office, Search Report in United Kingdom Patent Application No. GB2000943.7, 1 p. (dated Jun. 26, 2020).

* cited by examiner

CABLE MANAGEMENT DEVICE

CROSS-REFERENCE TO RELATED APPLICATIONS

This patent application claims the benefit of United Kingdom Patent Application No. 2000943.7, filed Jan. 22, 2020, which is incorporated herein by reference for all purposes.

BACKGROUND OF THE INVENTION

The present invention relates to a cable management device and a modular cable management system incorporating a plurality of the cable management devices.

Numerous different forms of cable management device exist. For example, U.S. Pat. Nos. 6,427,952 and 5,921,402 disclose cable retaining brackets which can be mounted on a surface or track. U.S. Pat. Nos. 8,985,530, 9,188,248 and 5,893,539 disclose systems with an elongate spine carrying a number of cable retaining rings. US2015/0086373 discloses a cable management system with a bracket defining a number of receptacles or compartments for keeping multiple cables of groups of cables separate. Nevertheless, a need remains for a simple, stable cable management device which can accommodate numerous cables, which can easy be built up into a modular cable management system.

SUMMARY OF THE INVENTION

The present invention provides a cable management device comprising a base and first and second arms extending from the base in a first direction, the base and the arms together defining an enclosure for receiving one or more cables, and a first attachment device configured to releasably attach the cable management device to a support element, the first attachment device comprising an elongate rod attached to the base portion and extending in a second direction perpendicular to the first direction, wherein the base and the arms have a width dimension in the second direction and the length of the elongate rod is greater than the width dimension so that the rod extends beyond each side of the enclosure.

The first attachment device thus acts both to attach the cable management device to a support element and to space the enclosures of adjacent cable management devices from one another.

Preferably the elongate rod extends in the second direction an equal distance on either side of the enclosure.

The cable management device may further comprise a second attachment device configured to releasably attach the cable management device to a support element and joined to the base at a location spaced from the first attachment device. This ensures the cable management device is firm and stable when fitted to a support element.

The base may comprise a U-shaped portion, which provides strength and flexibility. In this case, the first and second attachment devices are preferably joined to the base on opposite sides of the U-shaped portion. The first and second attachment devices may each be joined to the base by a connecting rib.

Preferably, the distal ends of the arms remote from the base overlap one another with a spacing therebetween, to facilitate a cable entering and exiting the enclosure. In addition, the width of the arms may decrease in the first direction extending from the base towards the distal ends.

Also, at least one aperture may be formed in one or both arms. These features improve visibility and accessibility of cables held in the enclosure.

The present invention also provides a cable management system comprising a support element in combination with a plurality of cable management devices as wherein the support element defines at least one elongate channel configured to releasable receive the first attachment device of the cable management devices.

Preferably, the support element further defines a second elongate channel for receiving the base of the cable management devices. In this case, the first channel may be formed on one side of the second channel and on the opposite side the second channel comprises a lip for releasable engagement with the second attachment device of the cable management devices.

BRIEF DESCRIPTION OF THE SEVERAL VIEWS OF THE DRAWINGS

The present invention will now be described in detail, by way of example only, with reference to the accompanying drawings in which.

DETAILED DESCRIPTION OF THE INVENTION

Figure 1:
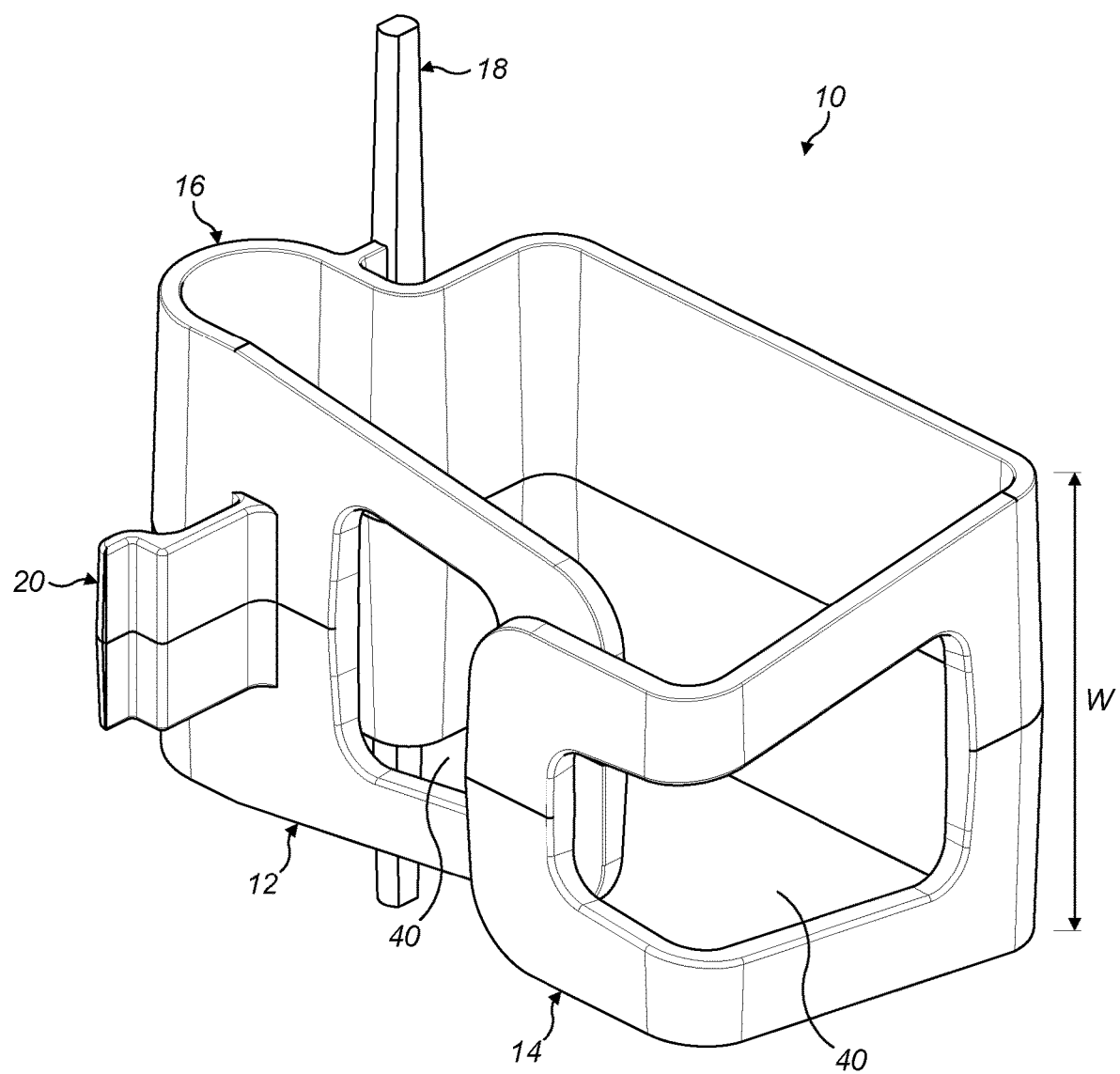
FIG. 1 is a perspective view of one embodiment of cable management device in accordance with the present invention.
Figure 2:
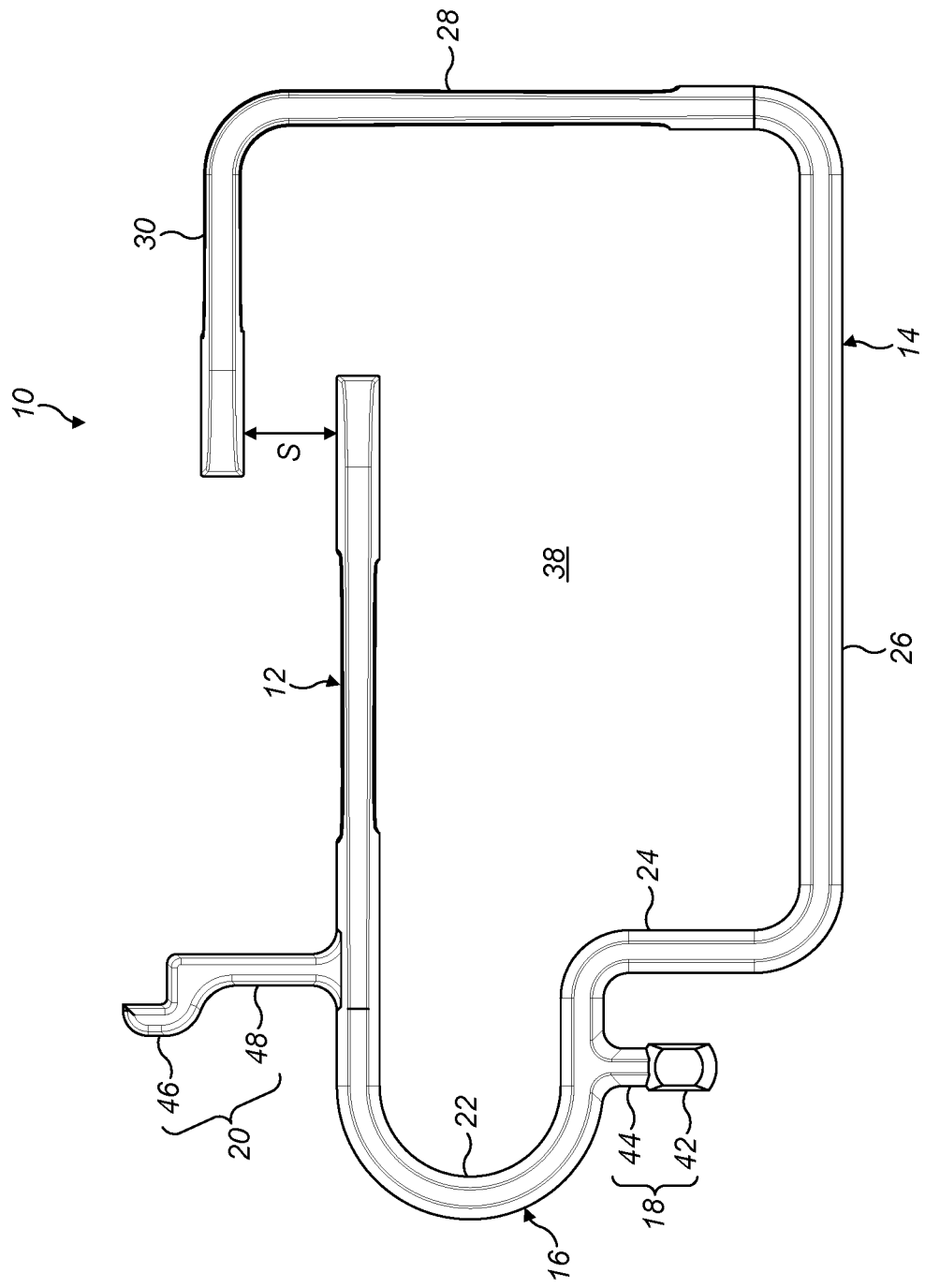
FIG. 2 is a plan view of the cable management device in FIG. 1, from below.

As best seen in FIGS. 1 and 2, a cable management device 10 in accordance with one embodiment of the present invention comprises first and second arms 12, 14 extending in a first direction from a base portion 16. The device 10 is typically a one-piece integral plastic moulding and therefore there is no strict delineation between the arms and the base portion but these terms are used herein for explaining the structure of the device 10.

In this example, the base portion 16 comprises a U-shaped portion 22 with a lateral extension 24 extending from the end of one limb of the U. The first arm 12 extends straight from the other limb of the U-shaped portion 22.

The second arm 14 includes a proximal portion 26 extending from the lateral extension 24, substantially perpendicular thereto and substantially parallel with the first arm 12. The second arm 14 further comprises a mid-portion 28 substantially perpendicular to and extending towards the first arm 12, and a distal portion 30 substantially parallel to the first arm 12 and extending back towards the base 16.

The distal portion 30 overlaps the distal end of the first arm 12. The overlapping portions are spaced apart as shown by arrow S. The spacing S is preferably greater than at least the diameter of one cable of the type intended to be held by the cable management device 10.

Thus, the first and second arms 12, 14 and the base 16 together define a cable enclosure 38. The configuration of the base 16 with a U-shaped portion 22 allows some flexing of the arms 12,14 in use, which can be helpful when cables are fitted into and removed from the enclosure 38. The precise shape and configuration of the arms and base can of course differ. For example, the enclosure may be substantially C-shaped or G-shaped, or other variations, provided that an area for receiving cables is defined and the arms are spaced apart or separable to some extent to allow cables to enter and exit the enclosure 38.

Preferably, at the distal ends of the first and second arms 12, 14, the corners 32, 34 are rounded to avoid any sharp edges which might damage cables.

As shown in FIG. 1, the first and second arms 12, 14 have a width dimension W which is preferably at a maximum adjacent the base portion 16 and decreases towards the distal ends. The arms 12, 14 may include one or more apertures 40. These features reduce the amount of material and the weight of cable management device 10 and provide enhanced visibility and accessibility of a cable bundle held within the enclosure 38 in use.

The cable management device 10 further comprises an attachment and spacer device 18 for attaching the device 10 to a support 50, as described further below, and a stabilizing clip 20.

The attachment and spacer device 18 comprises an elongate rod 42 joined to the base portion 16, preferably by a connecting rib 44. The rod 42 extends in a second direction, perpendicular to the first direction in which the arms 12, 14 extend away from the base 16, and is generally parallel to the width dimension W of the arms 12, 14. The length of the rod 42 is greater than the maximum width dimension of the arms 12, 14 and the base portion 16. Preferably the rod 42 is symmetrical about the base portion 16 and extends by a distance D both above and below the base portion 16.

Preferably, the cable management device 10 also comprises a stabilizing clip 20 which comprises a generally L-shaped bracket 46 connected to the base portion 16, such as by a second connecting rib 48. Preferably, the attachment and spacer device 18 and the stabilizing clip 20 are connected to opposite sides of the U-shaped portion 22 of the base 16.

The attachment and spacer device 18 and the clip 20 are configured to releasably attach the cable management device 10 to a support member 50 and to space the enclosures 38 of adjacent cable management devices 10 from one another. In one example, a support member 50 comprises an elongate element, typically formed by extrusion, which defines a number of internal channels.

Figure 3:
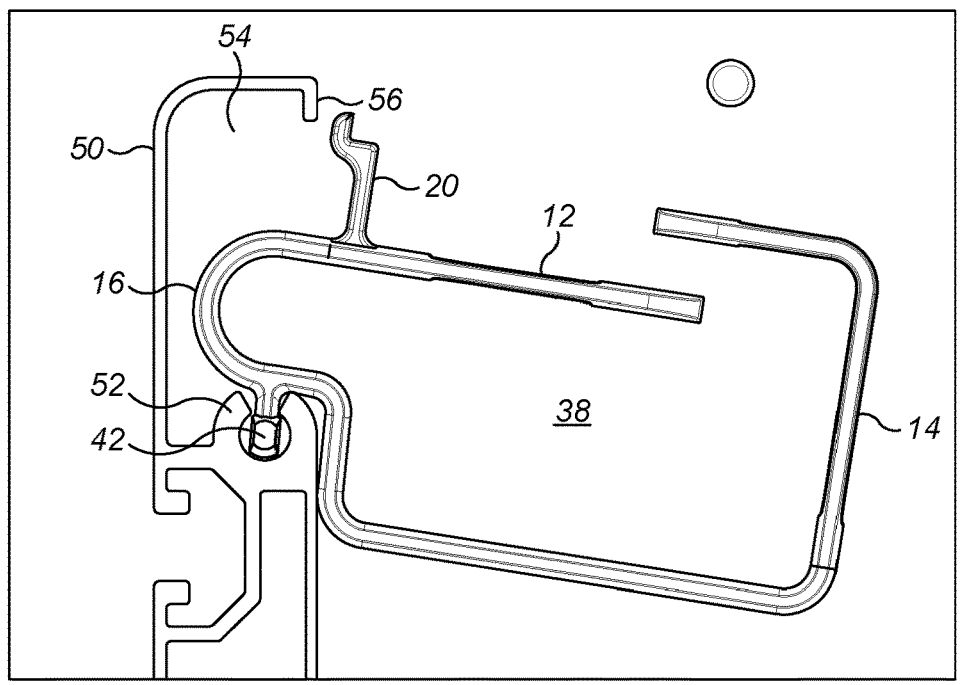
FIG. 3 shows a cross section of a support member with a cable management device partly fitted.
Figure 4:
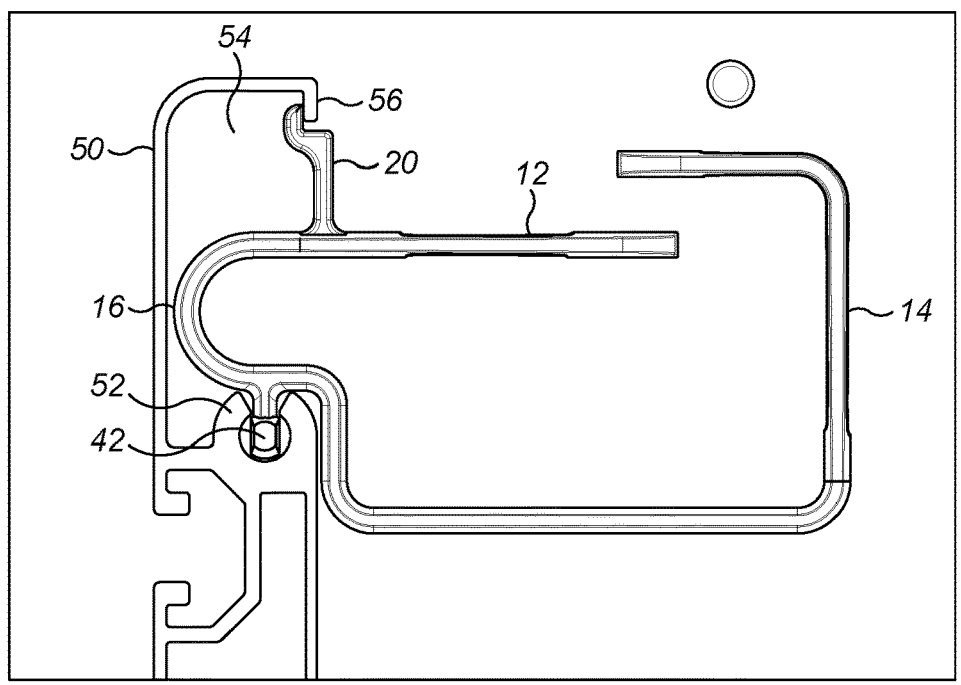
FIG. 4 is similar to FIG. 3 but shows the cable management device fully engaged with the support member.

As shown in FIGS. 3 and 4, in one embodiment, the support element 50 defines a first channel 52 for releasably receiving a rod 42 of a cable management device 10. The support member also defines a second channel 54 for receiving the U-shaped portion 22 of the base 16. The support member 50 is formed with a lip 56 at the side of the second channel 54 opposite to the location of the first channel 52. The L-shaped bracket 46 of the cable management device 10 is releasably engageable with the lip 56. In this way, a cable management device 10 can be stably fitted to the support member 50 and is braced against both sides of the second channel 54. This ensures the cable management device 10 is held firmly, making it easier to fit and remove cables, and it resists pivoting about the rod 42, which might break the connecting rib 44.

Figure 5:
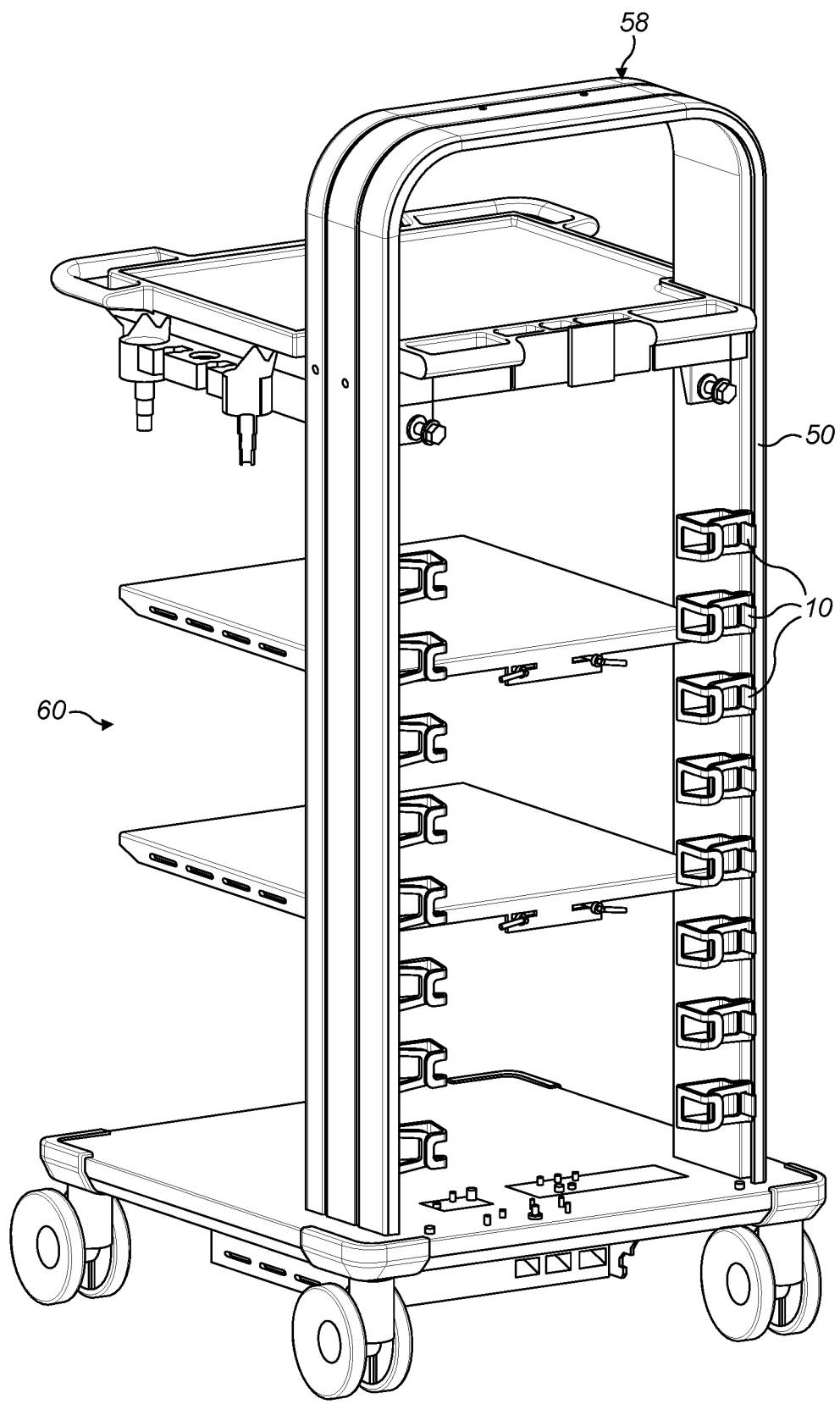
FIG. 5 is a perspective view of a trolley for carrying electrical equipment incorporating a cable management system in accordance with the present invention.

As shown in FIG. 5, in one example the support member 50 is part of a vertical frame 58 mounted on a wheeled trolley or workstation 60 which also carries a number of shelves for supporting electrical equipment requiring multiple cables. A series of cable management devices 10 can be fitted to the support element 50 to define a pathway for receiving the electrical cables.

Due to the length of the rod 42, when a first cable management device 10 is fitted at the bottom of the support member 50, the base portion 16 and arms 12, 14, and thus the enclosure 38, are spaced above the base of the workstation 60 by a distance D. When a subsequent cable management device 10 is fitted, the lower end of its rod 42 will abut the top end of the rod 42 of the first cable management device 10. Thus, the enclosures 38 of the two cable management devices 10 will be spaced apart by a distance 2D. This will be repeated as further cable management devices 10 are fitted to the support element 50.

In this way, a series of enclosures 38 are provided one above the other to accommodate a bundle of cables. However, since the enclosures 38 of adjacent cable management devices 10 are spaced apart by a distance 2D, there is improved visibility and accessibility of the bundle of cables. This is further enhanced by the apertures 40 formed in the arms 12, 14. If it is necessary to add or remove one or more cables from the bundle, it is easier to identify the relevant cable and manoeuvre it into or out of the enclosures 38 while leaving the other cables in place. Cables needed for equipment on a given shelf can be diverted from the main bundle and passed out through the spacing between two adjacent cable management devices 10 but do not need to be bent at a sharp angle to do so.

Each cable management device 10 is securely retained in the support member 50 due to the two opposing attachment means provided by the attachment and spacer device 18 and the stabilizing clip 20.

Thus, the invention provides an improved cable management device which is capable of securely retaining a bundle of cables and which can be combined with other cable management devices to form a modular cable management system which can be as long or short as desired. Individual cable management devices can be clipped in and out of a support member 50 without disassembly of the entire system and the integral spacer provided by rod 42 allows easier access to a cable bundle in use.

The invention claimed is:

1. A cable management system comprising
a support element in combination with a plurality of cable management devices,
each cable management device comprising a base portion and first and second arms extending from the base portion in a first direction, the base portion and the arms together defining an enclosure for receiving one or more cables, and a first attachment device and a second attachment device, the first attachment device being configured to releasably attach the cable management device to the support element, the first attachment device comprising an elongate rod attached to the base portion and extending in a second direction perpendicular to the first direction, wherein the base portion and the arms have a width dimension in the second direction, a length of the elongate rod being greater than the width dimensions of the base portion and the arms so that the rod extends beyond each side of the enclosure, the second attachment device being configured to releasably attach the cable management device to the support element and joined to the base portion at a location spaced from the first attachment device, wherein the support element including at least one first elongate channel configured to releasably receive the first attachment device of each of the cable management devices, and a second elongate channel for receiving the base portion of the cable management devices, wherein the first channel is formed on one side of the second channel and an opposite side the second channel comprises a lip for releasable engagement with the second attachment device of the cable management devices, and wherein, in assembly, the elongated rod is disposed in the first elongate channel to partially fit the cable management device in the support element, and the cable management device is then pivoted to position the base portion in the second elongate channel and to fully engage the second attachment device with the lip.

2. A cable management system as claimed in claim 1, wherein the elongate rod extends in the second direction an equal distance on either side of the enclosure.

3. A cable management system as claimed in claim 1, wherein the base portion comprises a U-shaped portion.

4. A cable management system as claimed in claim 3, wherein the first and second attachment devices are joined to the base portion on opposite sides of the U-shaped portion.

5. A cable management system as claimed in claim 4, wherein the first and second attachment devices are each joined to the base portion by a connecting rib.

6. A cable management system as claimed in claim 1, wherein the second arm further comprises a proximal portion substantially parallel to the first arm, a mid-portion substantially perpendicular to and extending towards the first arm and a distal portion substantially parallel to the first arm and extending back towards the base portion, and wherein distal ends of the arms remote from the base portion overlap one another with a spacing therebetween.

7. A cable management system as claimed in claim 1, wherein the width of the arms decreases from the base portion towards distal ends of the arms.

8. A cable management system as claimed in claim 1, further comprising at least one aperture formed in one or both arms.

* * * * *